(12) United States Patent
Palan et al.

(10) Patent No.: US 10,908,612 B2
(45) Date of Patent: Feb. 2, 2021

(54) SYSTEMS AND METHODS FOR AN AUTONOMOUS CART ROBOT

(71) Applicant: Toyota Research Institute, Inc., Los Altos, CA (US)

(72) Inventors: Saurabh R. Palan, Mountain View, CA (US); Manuel Ahumada, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 198 days.

(21) Appl. No.: 15/940,377

(22) Filed: Mar. 29, 2018

(65) Prior Publication Data

US 2019/0302775 A1 Oct. 3, 2019

(51) Int. Cl.

| | | |
|---|---|---|
| G05D 1/00 | (2006.01) |
| B25J 9/06 | (2006.01) |
| B25J 11/00 | (2006.01) |
| B25J 5/00 | (2006.01) |
| G05D 1/02 | (2020.01) |
| B62B 3/14 | (2006.01) |
| B62B 5/02 | (2006.01) |
| G06K 9/00 | (2006.01) |
| B62B 5/00 | (2006.01) |
| B62D 57/028 | (2006.01) |

(Continued)

(52) U.S. Cl.
CPC ............. *G05D 1/0212* (2013.01); *B62B 3/14* (2013.01); *B62B 5/0003* (2013.01); *B62B 5/02* (2013.01); *B62B 5/026* (2013.01); *B62D 57/022* (2013.01); *B62D 57/024* (2013.01); *B62D 57/028* (2013.01); *G05D 1/0088* (2013.01); *G06K 9/00664* (2013.01); *G06K 9/00805* (2013.01); *B62D 25/087* (2013.01); *G05D 2201/0216* (2013.01); *G06Q 30/0631* (2013.01)

(58) Field of Classification Search
None
See application file for complete search history.

(56) References Cited

U.S. PATENT DOCUMENTS 9,395,723 B2 * 7/2016 Pari ......................... B25J 5/007
9,403,566 B2 * 8/2016 Jacobsen ............ B62D 55/0655
(Continued)

FOREIGN PATENT DOCUMENTS

| DE | 102014016063 A1 | 5/2016 |
| GB | 2483855 A | 2/2012 |

(Continued)

OTHER PUBLICATIONS

Daifuku Wynright Corporation, "Truck/Container Loading and Unloading", Sep. 22, 2017, 2 pages total. http://www.wynright.com/products/by-system/receiving-systems/robotic-truck-unloading/.

(Continued)

*Primary Examiner* — Adam D Tissot
(74) *Attorney, Agent, or Firm* — Dinsmore & Shohl LLP

(57) ABSTRACT

A system may include a vehicle having a storage area and a guide rail configured to extend from the storage area. The system may further include a robot having a support portion comprising a placement surface and a base. The robot may also include a plurality of descendible wheels. The robot may also further include a plurality of legs, each connecting the support portion to one of the plurality of descendible wheels.

20 Claims, 13 Drawing Sheets

(51) Int. Cl.
    *B62D 57/02*     (2006.01)
    *B62D 57/024*     (2006.01)
    *G06Q 30/06*     (2012.01)
    *B62D 25/08*     (2006.01)

(56) References Cited

U.S. PATENT DOCUMENTS

| | | | |
|---|---|---|---|
| 9,507,995 | B2 | 11/2016 | Konolige et al. |
| 9,701,492 | B2 | 7/2017 | Criswell |
| 9,738,206 | B2 | 8/2017 | Scheer et al. |
| 9,747,480 | B2 | 8/2017 | McAllister |
| 2006/0103094 | A1* | 5/2006 | Wiff ............... B62B 3/004 280/79.11 |
| 2008/0167817 | A1 | 7/2008 | Hessler et al. |
| 2010/0263948 | A1* | 10/2010 | Couture ........... B62D 55/065 180/8.2 |
| 2017/0242430 | A1 | 8/2017 | Chan et al. |

FOREIGN PATENT DOCUMENTS

| | | | |
|---|---|---|---|
| JP | H0410179 A | 4/1992 | |
| WO | 2018017102 A1 | 1/2018 | |
| WO | WO-2018017102 A1 * | 1/2018 | ........... B62B 5/0003 |

OTHER PUBLICATIONS

Integrated Systems Design, "Automated Truck Loading/Unloading Systems", Sep. 22, 2017, 1 page total. http://www.isddd.com/auto-truck-loading.

Wynright Daifuku North America, "Robotic Truck Unloader (RTU)", Robotics Solutions, Dec. 20, 2013, 2 pages total. http://robotics.wynright.com/pdf/RTU.pdf.

International Search Report and Written Opinion with notification transmittal dated Jun. 18, 2019 in related International Application No. PCT/US2019/024511 (15 pages total).

\* cited by examiner

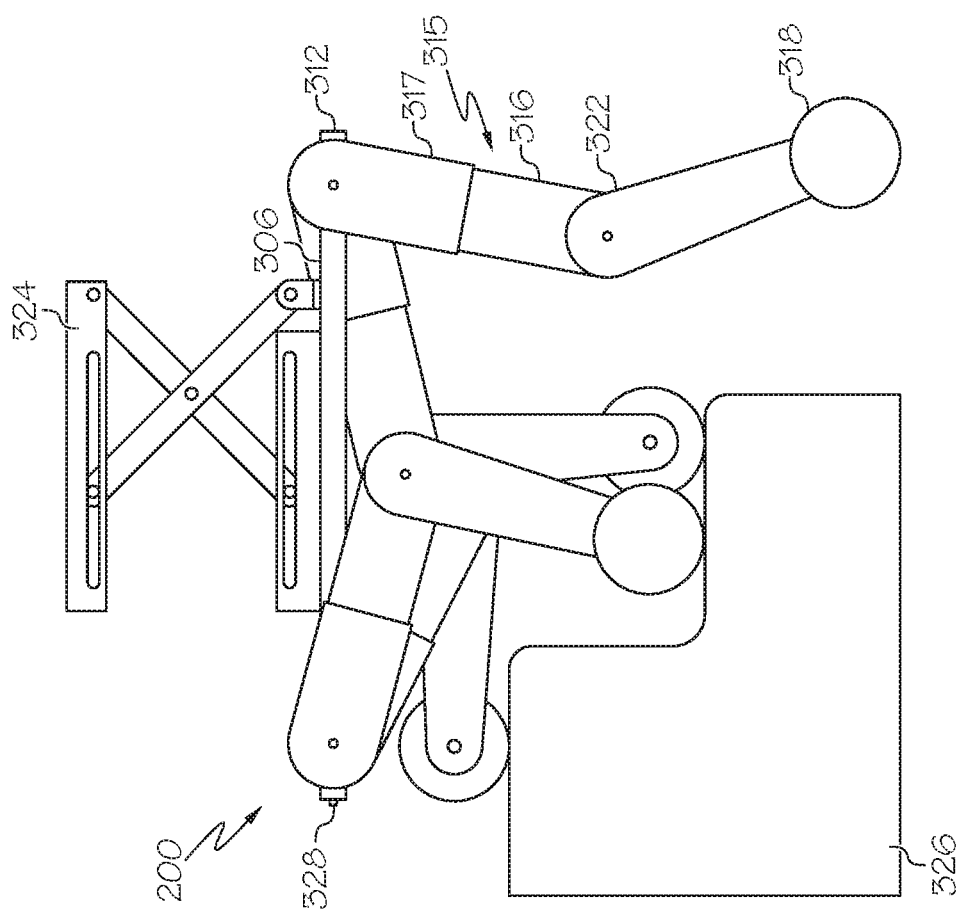

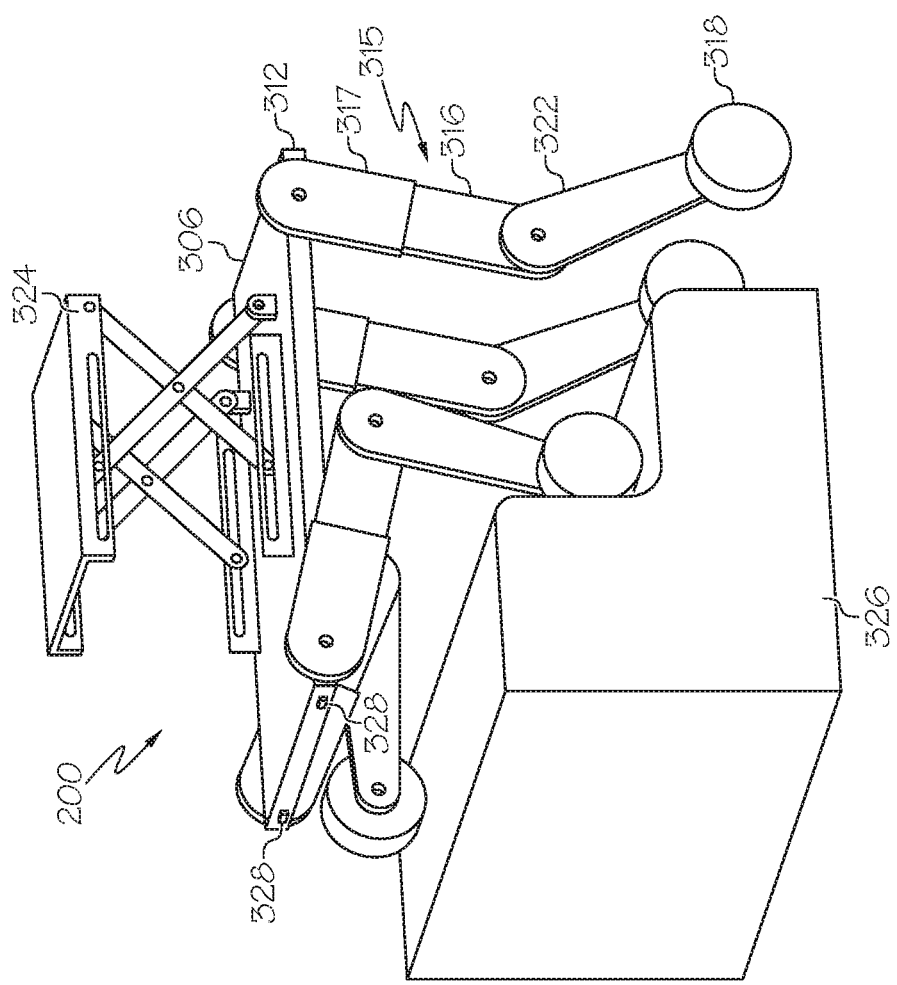

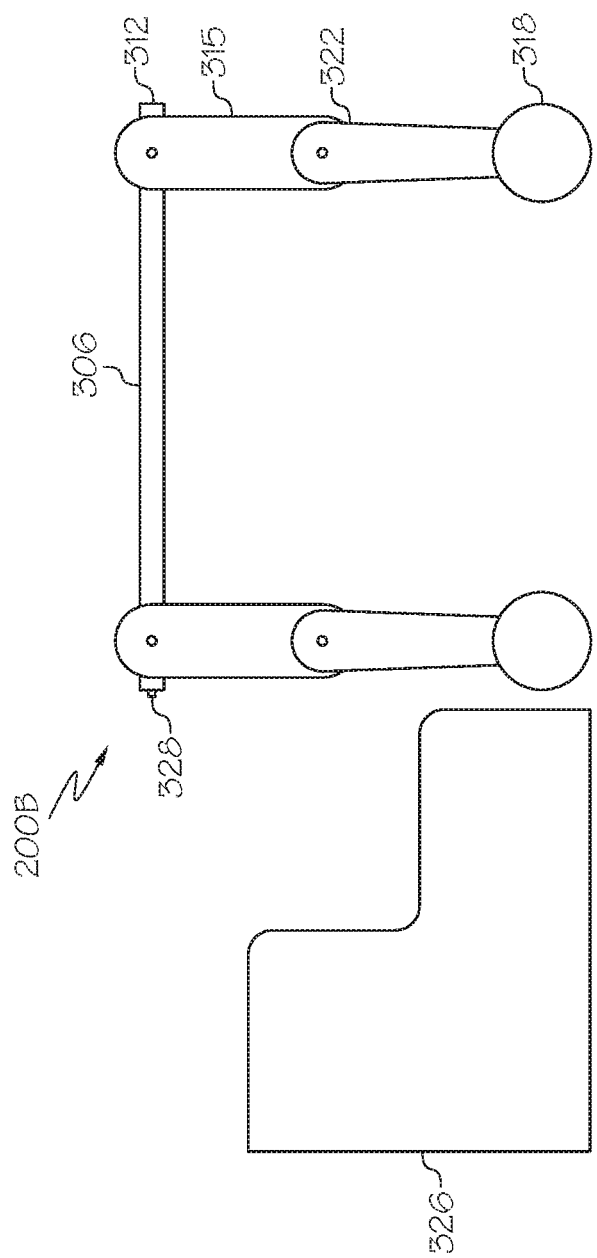

SYSTEMS AND METHODS FOR AN AUTONOMOUS CART ROBOT

TECHNICAL FIELD

The present application generally relates to autonomous robotics and, more particularly, to an autonomous cart robot that can automatically dock itself within the trunk of a vehicle without human assistance to load/unload objects into the vehicle's trunk.

BACKGROUND

People have to manually load and unload groceries and other items into the trunk of a vehicle. This can be difficult, particularly for an elderly person who cannot lift heavier objects. Such loading and unloading may also be time-consuming and tedious since groceries are often loaded or unloaded bag by bag.

Accordingly, a need exists for robots to assist people with obtaining objects and loading/unloading these objects from vehicles.

SUMMARY

A system may comprise a vehicle having a storage area and a guide rail configured to extend from the storage area. The system may further comprise a robot having a support portion comprising a placement surface and a base. The robot may comprise a plurality of discrete boundary supports at a plurality of non-parallel boundaries of the placement surface, wherein the discrete boundary supports are foldable at the boundaries of the placement surface, wherein at least two of the plurality of discrete boundary supports are non-parallel. The robot may also comprise a plurality of descendible wheels. The robot may further include a plurality of legs, each connecting the support portion to one of the plurality of descendible wheels.

In another embodiment, a method may comprise extending a guide rail to protrude outside of a vehicle from within a storage area of the vehicle. The method may further include moving a robot, having a placement surface acting as a floor of the storage area, onto the guide rail. The method may still further include descending wheels from the robot once the robot exits the storage area. The method may also include separating the guide rail and the robot. The method may additional include retracting the guide rail back into the storage area and maintaining the placement surface to be within a threshold angular distance of being horizontal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6C illustrates a side view of a robot traversing stairs according to one or more embodiments described and illustrated herein;

FIG. 6D illustrates a perspective view of the side view of FIG. 6C according to one or more embodiments described and illustrated herein;

FIG. 9 illustrates a side view of another embodiment of a robot near stairs according to one or more embodiments described and illustrated herein.

DETAILED DESCRIPTION

Embodiments of the present disclosure are directed to an autonomous cart robot that can automatically dock itself within a storage area of a vehicle without human assistance to load/unload objects into the vehicle's storage area. More specifically, the robot may be integrated into the vehicle, so that when it is stowed in the trunk, it can act as the bed of the trunk. Once outside of the vehicle, the robot may act as a shopping cart following a user around. Various embodiments of the autonomous cart robot and systems including the autonomous cart robot and a vehicle are described in detail below.

Figure 1:
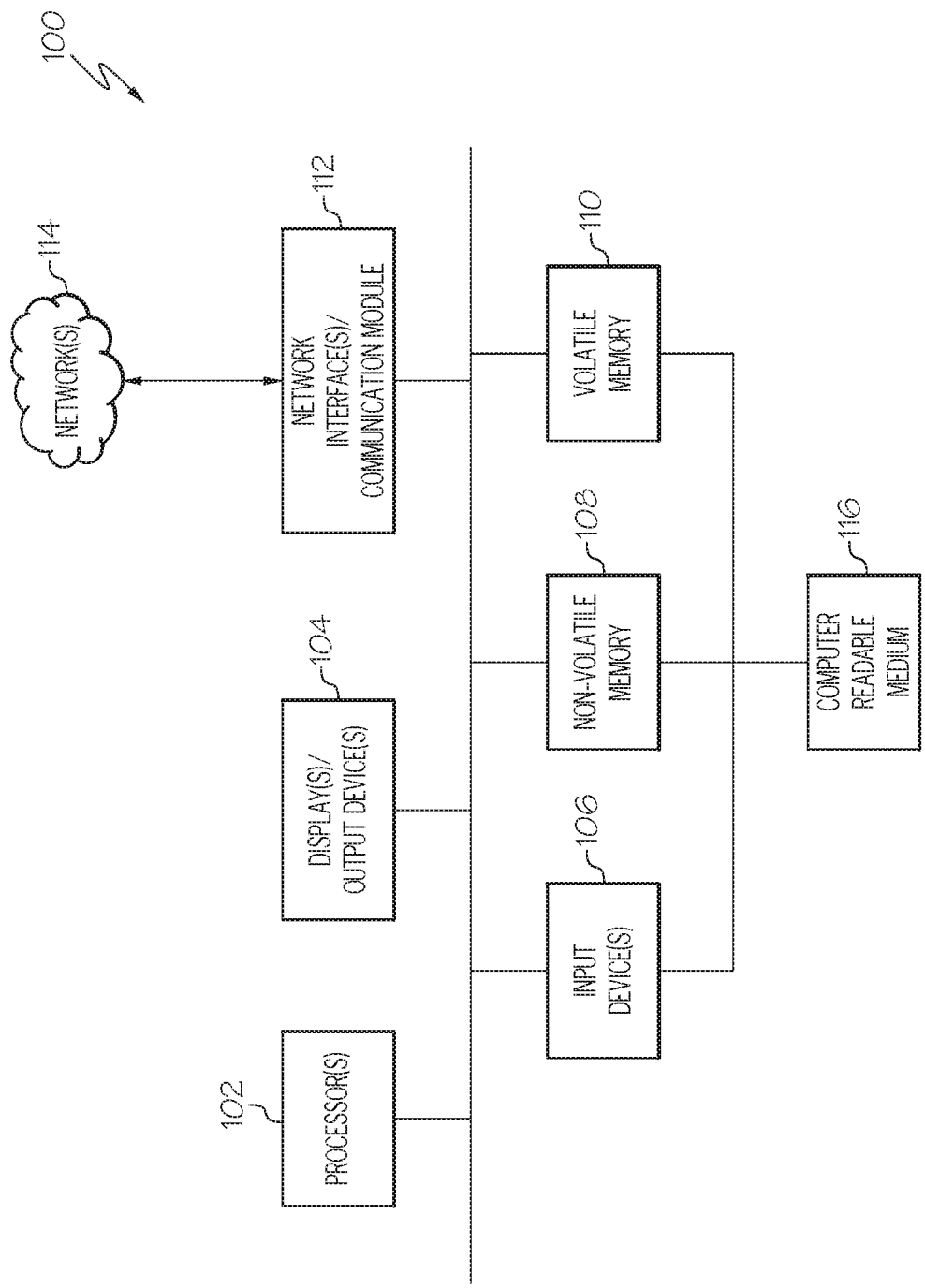
FIG. 1 is a block diagram illustrating computing hardware utilized in one or more devices for implementing various systems and processes, according one or more embodiments shown and described herein.

Turning to FIG. 1, a block diagram illustrates an example of a computing device 100, through which embodiments of the disclosure can be implemented, for example in a robot. The computing device 100 described herein is but one example of a suitable computing device and does not suggest any limitation on the scope of any embodiments presented. Nothing illustrated or described with respect to the computing device 100 should be interpreted as being required or as creating any type of dependency with respect to any element or plurality of elements. In various embodiments, a computing device 100 may include, but need not be limited to, a desktop, laptop, server, client, tablet, smartphone, or any other type of device that can receive, send, and/or process data. In an embodiment, the computing device 100 includes at least one processor 102 and memory (non-volatile memory 108 and/or volatile memory 110). The computing device 100 can include one or more displays and/or output devices 104 such as monitors, speakers, headphones, projectors, wearable-displays, holographic displays, and/or printers, for example. The computing device 100 may further include one or more input devices 106 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 100 may include non-volatile memory 108 (ROM, flash memory, etc.), volatile memory 110 (RAM, etc.), or a combination thereof. A network interface 112 can facilitate communications over a network 114 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 112 can be communicatively coupled to any device capable of transmitting and/or receiving data via the network 114. Accordingly, the hardware of the network interface 112 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 116 may comprise a plurality of computer readable mediums, each of which may be either a computer readable storage medium or a computer readable signal medium. A computer readable storage medium 116 may reside, for example, within an input device 106, non-volatile memory 108, volatile memory 110, or any combination thereof. A computer readable storage medium can include tangible media that may be able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 100 may include one or more network interfaces 112 to facilitate communication with one or more remote devices, which may include, for example, client and/or server devices. A network interface 112 may also be described as a communications module, as these terms may be used interchangeably.

Figure 2:
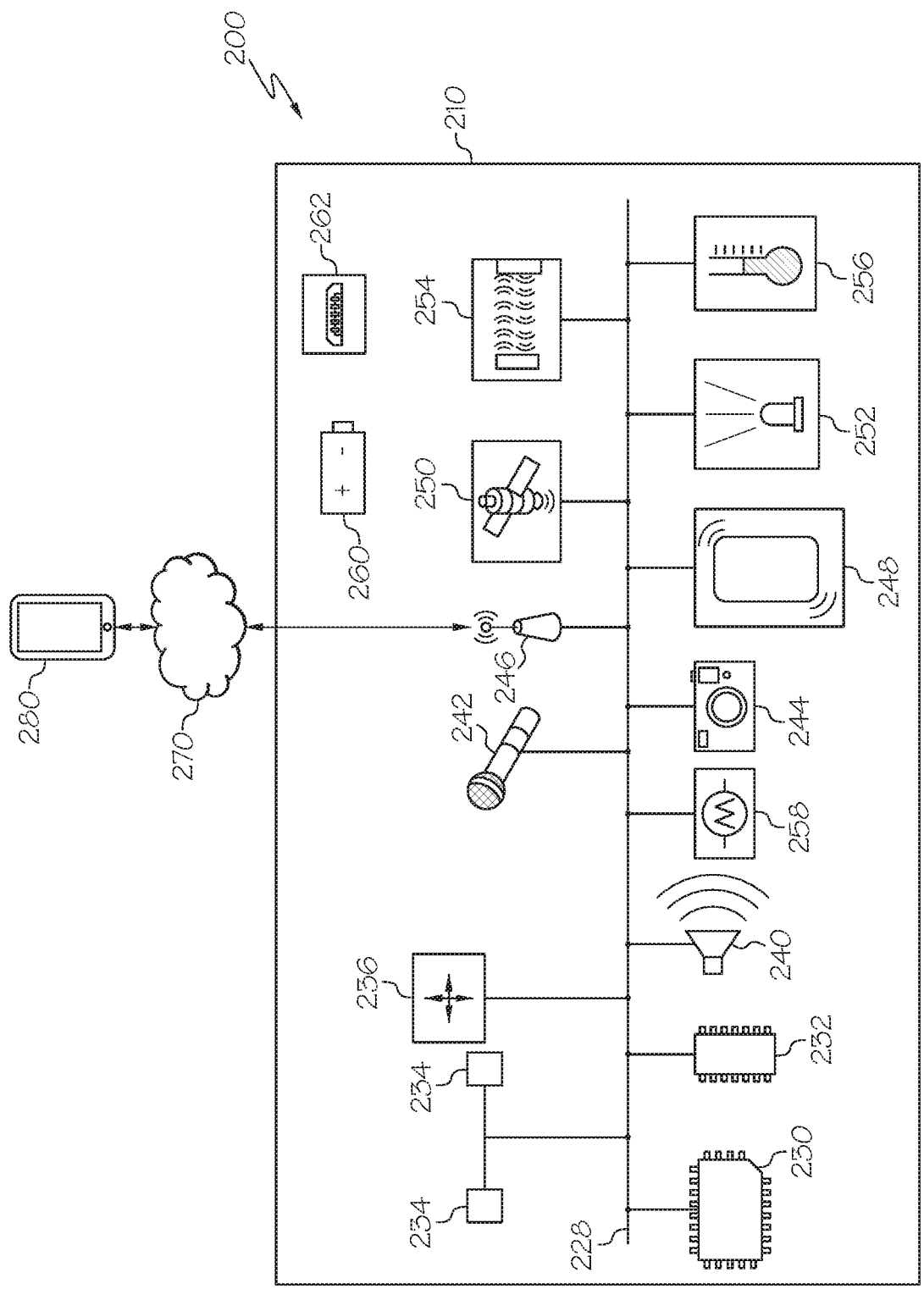
FIG. 2 is a block diagram illustrating hardware utilized in one or more robots for implementing various systems and processes, according one or more embodiments shown and described herein.

Turning to FIG. 2, example components of one embodiment of a robot 200 is schematically depicted. The robot 200 includes a housing 210, a communication path 228, a processor 230, a memory module 232, an inertial measurement unit 236, an input device 238, an audio output device 240 (e.g., a speaker), a microphone 242, a camera 244, network interface hardware 246, a tactile feedback device 248, a location sensor 250, a light 252, a proximity sensor 254, a temperature sensor 256, a motorized wheel assembly 258, a battery 260, and a charging port 262. The components of the robot 200 other than the housing 210 may be contained within or mounted to the housing 210. The various components of the robot 200 and the interaction thereof will be described in detail below.

Still referring to FIG. 2, the communication path 228 may be formed from any medium that may be capable of transmitting a signal such as, for example, conductive wires, conductive traces, optical waveguides, or the like. Moreover, the communication path 228 may be formed from a combination of mediums capable of transmitting signals. In one embodiment, the communication path 228 comprises a combination of conductive traces, conductive wires, connectors, and buses that cooperate to permit the transmission of electrical data signals to components such as processors, memories, sensors, input devices, output devices, and communication devices. Accordingly, the communication path 228 may comprise a bus. Additionally, it is noted that the term "signal" may mean a waveform (e.g., electrical, optical, magnetic, mechanical or electromagnetic), such as DC, AC, sinusoidal-wave, triangular-wave, square-wave, vibration, and the like, capable of traveling through a medium. The communication path 228 communicatively couples the various components of the robot 200. As used herein, the term "communicatively coupled" means that coupled components are capable of exchanging data signals with one another such as, for example, electrical signals via conductive medium, electromagnetic signals via air, optical signals via optical waveguides, and the like.

The processor 230 of the robot 200 may be any device capable of executing machine-readable instructions. Accordingly, the processor 230 may be a controller, an integrated circuit, a microchip, a computer, or any other computing device. The processor 230 may be communicatively coupled to the other components of the robot 200 by the communication path 228. Accordingly, the communication path 228 may communicatively couple any number of processors with one another, and allow the components coupled to the communication path 228 to operate in a distributed computing environment. Specifically, each of the components may operate as a node that may send and/or receive data. While the embodiment depicted in FIG. 2 includes a single processor 230, other embodiments may include more than one processor.

Still referring to FIG. 2, the memory module 232 of the robot 200 may be coupled to the communication path 228 and communicatively coupled to the processor 230. The memory module 232 may comprise RAM, ROM, flash memories, hard drives, or any non-transitory memory device capable of storing machine-readable instructions such that the machine-readable instructions can be accessed and executed by the processor 230. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 232. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single memory module 232, other embodiments may include more than one memory module.

Two sensors 234 (visual, weight, tactile, radar, lidar, infrared, time of flight, etc.) are depicted on the robot 200, although any suitable number (including none) may be utilized, and include any suitable hardware such as processors, memory, wired/wireless communication and/or power components. The sensors 234 may but need not be of the same type and/or model. A sensor 234 may be included on any suitable portion of the robot 200, without regard to the placement of other sensors 234. The inertial measurement unit 236, if provided, may be coupled to the communication path 228 and communicatively coupled to the processor 230. The inertial measurement unit 236 may include one or more accelerometers and one or more gyroscopes. The inertial measurement unit 236 transforms sensed physical movement of the robot 200 into a signal indicative of an orientation, a rotation, a velocity, or an acceleration of the robot 200. The operation of the robot 200 may depend on an orientation of the robot 200 (e.g., whether the robot 200 is horizontal, tilted, and the like). Some embodiments of the robot 200 may not include the inertial measurement unit 236, such as embodiments that include an accelerometer but not a gyroscope, embodiments that include a gyroscope but not an accelerometer, or embodiments that include neither an accelerometer nor a gyroscope.

Still referring to FIG. 2, one or more input devices 238 are coupled to the communication path 228 and communicatively coupled to the processor 230. The input device 238 may be any device capable of transforming user contact into a data signal that can be transmitted over the communication path 228 such as, for example, a button, a switch, a knob, a microphone or the like. In some embodiments, the input device 238 includes a power button, a volume button, an activation button, a scroll button, or the like. The one or more input devices 238 may be provided so that the user may interact with the robot 200, such as to navigate menus, make selections, set preferences, and other functionality described herein. In some embodiments, the input device 238 includes a pressure sensor, a touch-sensitive region, a pressure strip, or the like. It should be understood that some embodiments may not include the input device 238. As described in more detail below, embodiments of the robot 200 may include multiple input devices disposed on any surface of the housing 210. In some embodiments, one or more of the input devices 238 are configured as a fingerprint sensor for unlocking the robot. For example, only a user with a registered fingerprint may unlock and use the robot 200.

The speaker 240 (i.e., an audio output device) may be coupled to the communication path 228 and communicatively coupled to the processor 230. The speaker 240 transforms audio message data from the processor 230 of the robot 200 into mechanical vibrations producing sound. For example, the speaker 240 may provide to the user navigational menu information, setting information, status information, information regarding the environment as detected by image data from the one or more cameras 244, and the like. However, it should be understood that, in other embodiments, the robot 200 may not include the speaker 240.

The microphone 242 may be coupled to the communication path 228 and communicatively coupled to the processor 230. The microphone 242 may be any device capable of transforming a mechanical vibration associated with sound into an electrical signal indicative of the sound. The microphone 242 may be used as an input device 238 to perform tasks, such as navigate menus, input settings and parameters, and any other tasks. It should be understood that some embodiments may not include the microphone 242.

Still referring to FIG. 2, the camera 244 may be coupled to the communication path 228 and communicatively coupled to the processor 230. The camera 244 may be any device having an array of sensing devices (e.g., pixels) capable of detecting radiation in an ultraviolet wavelength band, a visible light wavelength band, or an infrared wavelength band. The camera 244 may have any resolution. The camera 244 may be an omni-directional camera, or a panoramic camera. In some embodiments, one or more optical components, such as a mirror, fish-eye lens, or any other type of lens may be optically coupled to the camera 244. As described in more detail below, the camera 244 is a component of an imaging assembly 222 operable to be raised above the housing 210 to capture image data.

The network interface hardware 246 may be coupled to the communication path 228 and communicatively coupled to the processor 230. The network interface hardware 246 may be any device capable of transmitting and/or receiving data via a network 270. Accordingly, network interface hardware 246 can include a wireless communication module configured as a communication transceiver for sending and/or receiving any wired or wireless communication. For example, the network interface hardware 246 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 246 includes hardware configured to operate in accordance with the Bluetooth wireless communication protocol. In another embodiment, network interface hardware 246 may include a Bluetooth send/receive module for sending and receiving Bluetooth communications to/from a portable electronic device 280. The network interface hardware 246 may also include a radio frequency identification ("RFID") reader configured to interrogate and read RFID tags.

In some embodiments, the robot 200 may be communicatively coupled to a portable electronic device 280 via the network 270. In some embodiments, the network 270 is a personal area network that utilizes Bluetooth technology to communicatively couple the robot 200 and the portable electronic device 280. In other embodiments, the network 270 may include one or more computer networks (e.g., a personal area network, a local area network, or a wide area network), cellular networks, satellite networks and/or a global positioning system and combinations thereof. Accordingly, the robot 200 can be communicatively coupled to the network 270 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, as stated above, the network 270 may be utilized to communicatively couple the robot 200 with the portable electronic device 280. The portable electronic device 280 may include a mobile phone, a smartphone, a personal digital assistant, a camera, a dedicated mobile media player, a mobile personal computer, a laptop computer, and/or any other portable electronic device capable of being communicatively coupled with the robot 200. The portable electronic device 280 may include one or more processors and one or more memories. The one or more processors can execute logic to communicate with the robot 200. The portable electronic device 280 may be configured with wired and/or wireless communication functionality for communicating with the robot 200. In some embodiments, the portable electronic device 280 may perform one or more elements of the functionality described herein, such as in embodiments in which the functionality described herein is distributed between the robot 200 and the portable electronic device 280.

The location sensor 250 may be coupled to the communication path 228 and communicatively coupled to the processor 230. The location sensor 250 may be any device capable of generating an output indicative of a location. In some embodiments, the location sensor 250 includes a global positioning system (GPS) sensor, though embodiments are not limited thereto. Some embodiments may not include the location sensor 250, such as embodiments in which the robot 200 does not determine a location of the robot 200 or embodiments in which the location may be determined in other ways (e.g., based on information received from the camera 244, the microphone 242, the network interface hardware 246, the proximity sensor 254, the inertial measurement unit 236 or the like). The location sensor 250 may also be configured as a wireless signal sensor capable of triangulating a location of the robot 200 and the user by way of wireless signals received from one or more wireless signal antennas.

The motorized wheel assembly 258 may be coupled to the communication path 228 and communicatively coupled to the processor 230, where the wheel assembly in some embodiments corresponds to wheels 318 as discussed below. As described in more detail below, the motorized wheel assembly 258 includes motorized wheels (not shown) that are driven by one or motors (not shown). The processor 230 may provide one or more drive signals to the motorized wheel assembly 258 to actuate the motorized wheels such that the robot 200 travels to a desired location, such as a location that the user wishes to acquire environmental information (e.g., the location of particular objects within at or near the desired location).

Still referring to FIG. 2, the light 252 may be coupled to the communication path 228 and communicatively coupled to the processor 230. The light 252 may be any device capable of outputting light, such as, but not limited to, a light emitting diode, an incandescent light, a fluorescent light, or the like. Some embodiments include a power indicator light that is illuminated when the robot 200 is powered on. Some embodiments include an activity indicator light that is illuminated when the robot 200 is active or processing data. Some embodiments include an illumination light for illuminating the environment in which the robot 200 is located. Some embodiments may not include the light 252.

The proximity sensor 254 may be coupled to the communication path 228 and communicatively coupled to the processor 230. The proximity sensor 254 may be any device capable of outputting a proximity signal indicative of a proximity of the robot 200 to another object. In some embodiments, the proximity sensor 254 may include a laser scanner, a capacitive displacement sensor, a Doppler effect sensor, an eddy-current sensor, an ultrasonic sensor, a magnetic sensor, an optical sensor, a radar sensor, a lidar sensor, a sonar sensor, or the like. Some embodiments may not include the proximity sensor 254, such as embodiments in which the proximity of the robot 200 to an object is determine from inputs provided by other sensors (e.g., the camera 244, the speaker 240, etc.) or embodiments that do not determine a proximity of the robot 200 to an object, obstacle, person, etc.

The temperature sensor 256 may be coupled to the communication path 228 and communicatively coupled to the processor 230. The temperature sensor 256 may be any device capable of outputting a temperature signal indicative of a temperature sensed by the temperature sensor 256. In some embodiments, the temperature sensor 256 may include a thermocouple, a resistive temperature device, an infrared sensor, a bimetallic device, a change of state sensor, a thermometer, a silicon diode sensor, or the like. Some embodiments of the robot 200 may not include the temperature sensor 256.

Still referring to FIG. 2, the robot 200 may be powered by the battery 260, which may be electrically coupled to the various electrical components of the robot 200. The battery 260 may be any device capable of storing electric energy for later use by the robot 200. In some embodiments, the battery 260 is a rechargeable battery, such as a lithium-ion battery or a nickel-cadmium battery. In embodiments in which the battery 260 is a rechargeable battery, the robot 200 may include the charging port 262, which may be used to charge the battery 260. Some embodiments may not include the battery 260, such as embodiments in which the robot 200 is powered the electrical grid, by solar energy, or by energy harvested from the environment. Some embodiments may not include the charging port 262, such as embodiments in which the apparatus utilizes disposable batteries for power.

Figure 3A:
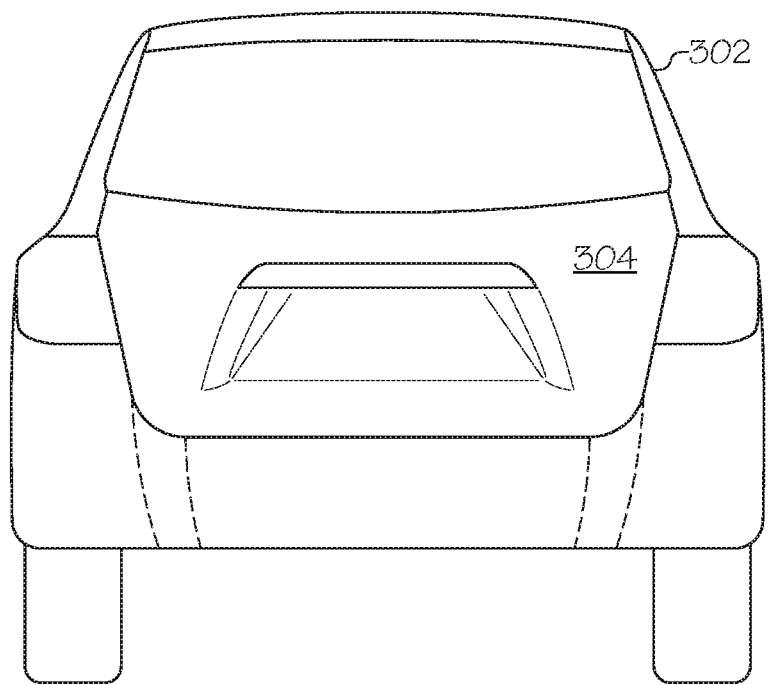
FIG. 3A illustrates a rear view of a vehicle having a closed storage area according to one or more embodiments described and illustrated herein.

Turning to FIG. 3A, a rear view of a vehicle 302 having a closed storage area 304 is presented. A vehicle 302 may include anything capable of transporting one or more passengers, including but not limited to cars, trucks, motorcycles, bicycles or any other type of passenger-powered vehicles, aircraft, spacecraft, watercraft, submarines, or any other type of vehicle capable of having a storage area 304. A vehicle 302 may be navigated by an operator, such as a driver, pilot, captain, etc. In other embodiments, the vehicle 302 may be partially autonomous, for example where the vehicle 302 completes some tasks for the driver, such as parking or keeping the vehicle in a lane. In still other embodiments, the vehicle 302 may be fully autonomous, for example where the vehicle 302 operates with no input or minimal input (such as providing destination information or route preferences) from any occupant. In some embodiments a storage area many not be part of a vehicle.

The vehicle 302 may have one or more storage areas 304 which may be any area that is part of or attached to the vehicle 302 that can be closed and opened. In this embodiment the storage area 304 is the trunk of the vehicle 302. Storage areas 304 may be pressured/unpressurized, transparent/translucent/opaque, lockable, lighted, insulated, sound damped, soundproof, subject to one or more timers, ventilated, and/or airtight (such that no liquids or gasses may travel in or out the storage area). In various embodiments a vehicle's passenger compartment may be a storage area 304.

Figure 3B:
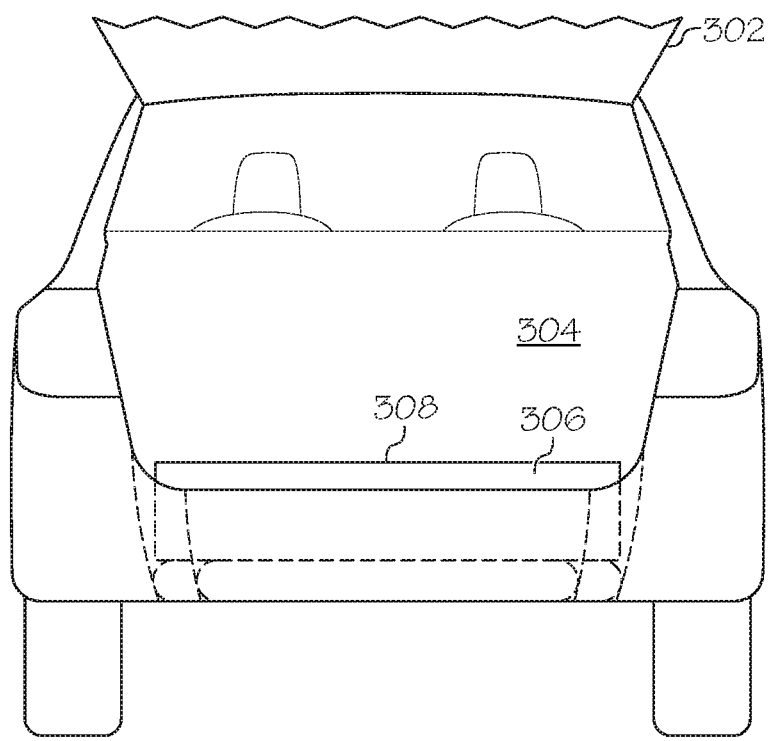
FIG. 3B illustrates a rear view of a vehicle having an open storage area exposing a visible placement surface of a robot according to one or more embodiments described and illustrated herein.

Turning to FIG. 3B, a rear view of a vehicle 302 having an open storage area 304 exposing a visible placement surface 306 of a robot 200 is presented. In this embodiment, the placement surface 306 functions as a floor of the storage area 304. In this embodiment, the flatness of the placement surface 306 within the one or more placement surface boundaries 308 allows objects (such as groceries or any other suitable object types) to be placed thereon. In other embodiments the placement surface 306 may have an uneven surface with one or more depressions or raised portions, such as grooves or dimples, to further accommodate objects to rest upon the depressions or raised portions.

Figure 4:
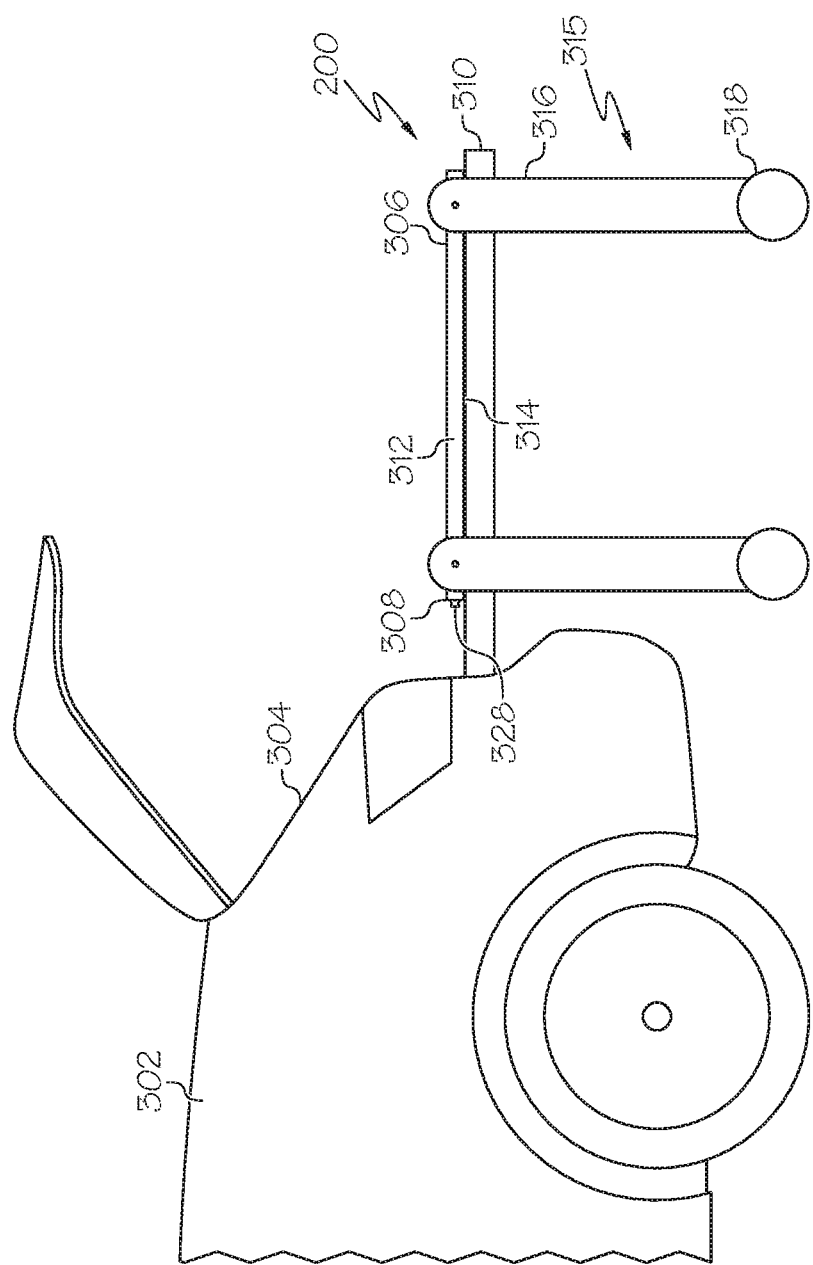
FIG. 4 illustrates a side view of a robot exiting a storage area of a vehicle according to one or more embodiments described and illustrated herein.

Turning to FIG. 4, a side view of a robot 200 exiting a storage area 304 (depicted here as a trunk) of a vehicle 302 is presented. The placement surface 306 of the robot 200 forms one surface of a support portion 312 of the robot 200. In this embodiment the support portion 312 has a base 314 underneath, opposite the placement surface 306 with respect to the support portion 312. In other embodiments the base 314 and placement surface 306 need not be directly opposite. The robot 200 may also include legs 315, depicted here as being extendible/retractable with respect to the support portion 312, although they may be fixed/non-moving in other embodiments. The legs 315 may be connected at the placement surface boundary 308, to the base 314, or any other suitable part of the support portion 312 of the robot 200. Although four legs 315 of the same size and/or length are depicted here, any suitable number of legs may be utilized in other embodiments, and for embodiments utilizing a plurality of legs 315, the legs 315 need not have the same or even similar type of extendibility/retractability (if at all), type of folding, size and/or length (at full extension, at full retraction, etc.). In this embodiment each leg 315 may retract fully into the base 314 of the support portion 312, although the legs 315 may only partially retract. As discussed below with respect to FIG. 5B, extension/retraction of a leg 315 may involve a change in length (such as telescopic length changes) and/or a folding/straightening of the leg 315. As discussed below with respect to FIGS. 6A-B, a leg may have one or more flexible joints 322 in various embodiments.

In some embodiments a vehicle 302 may have one or more guide rails 310 in the storage area 304, which may be actuated to extend out of the vehicle 302 to provide egress for a robot 200 from the storage area 304, as depicted in FIG. 4. In some embodiments guide rails 310 may be actuated to extend into other parts of the vehicle 302, which may or may not lead to extension of the guide rail 310 outside of the vehicle 302. The guide rail 310 may extend/retract by any suitable mechanism, such as telescopic expansion, lateral sliding (such as with rotors/wheels in the vehicle 302 or storage area 304), magnetically movement/levitation, etc. Here, a triggering event, such as the opening of the storage area 304, causes the guide rail 310 to extend out of the storage area 304. In various embodiments the robot 200 maintains a level placement surface 306 to prevent objects resting upon it from falling off the robot 200 or falling over on the placement surface 306 during ingress/egress of the robot 200. This may involve maintaining the placement surface 306 at a constant horizontal level without any tilt, or in other embodiments providing a restriction on the amount of tilt permitted, which may be specified in some embodiments. The guide rail 310 may be detachably coupled to the robot 200 during entry or exit of the storage area 304.

In some embodiments triggering events may include user input (as used hereinafter may include voice commands, gesture commands, typed/touchscreen input provided by the user into the robot 200 itself or on anther device capable of communicating with the robot 200) received by the vehicle 302 and/or the robot 200. Any suitable type of triggering event may be utilized, such as a person entering/exiting the vehicle 302, the vehicle 302 arriving at a specified location/zone, a specific time or time range, etc. The robot 200 may emerge once the guide rail 310 has fully extended, partially extended, or may emerge with the guide rail 310 as it extends out of the storage area 304. In this embodiment the guide rail 310 provides one or more pathways or grooves for wheels 318 that are part of the robot 200. In other embodiments a guide rail 310 may interact with other portions of the robot 200, such as the support portion 312, with support for the robot 200 to emerge from the storage area 304, such as clamping, sliding, locking, magnetics, etc. The robot 200 may also utilize the guide rail 310 to enter or exit the storage area while maintaining the placement surface 306 at a horizontal level without tilt or within a threshold amount of tilt.

The vehicle 302 may also provide for one or more guide rails 310 to retract back into a storage area 304, which may provide ingress for a robot 200 back into the storage area 304. In various embodiments the robot 200 may re-enter the storage area 304 in the reverse order of how it emerges, although in other embodiments reentry of the robot 200 may not merely be the reverse of how the robot 200 exits the storage area 304. Moreover, retraction of a leg 315 need not be merely the reverse procedure of extension of the leg 315. Any suitable type of triggering event may be utilized, such as the robot 200 and/or a person entering/exiting the vehicle 302, the robot 200 and/or a person arriving at a certain location/zone or threshold distance of the vehicle 302, a specific time or time range, etc. In some embodiments triggering events may include voice and/or gesture commands received by the vehicle 302 and/or the robot 200. In some embodiments the guide rail 310 may then engage the support portion 312 of the robot 200. In other embodiments, once the guide rail 310 is under the support portion 312 of the robot 200, the legs 315 and wheels 318 may be connected to and/or retract into the base 314 of the support portion 312, so that the wheels 318 engage the guide rail 310. In this embodiment some or all of the wheels 318 may be descendible, but may not be in other embodiments. In some embodiments the legs 315 and/or wheels 318 may fold into the base 314. As discussed above, any suitable type of coupling mechanism may be utilized to secure the robot 200 to the guide rail 310. Once coupled to the guide rail 310, the robot 200 may travel into the storage area 304 once the guide rail 310 has fully retracted, partially retracted, or may move into the storage area 304 prior to retraction of the guide rail 310 into the storage area 304. In some embodiments the wheels 318 are configured to be actuated from a stored position under the base 314 to drop down to ground-level when the robot 200 exits a storage area 304.

Figure 5A:
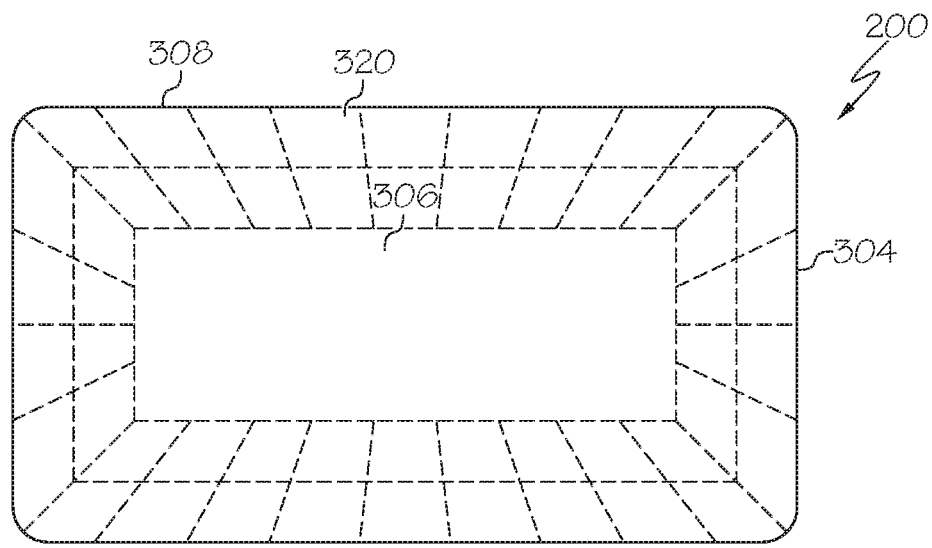
FIG. 5A illustrates a top-down view of a robot according to one or more embodiments shown and described herein.

Turning to FIG. 5A, a top-down view of a robot 200 is presented. In this embodiment a robot 200 lies at the bottom of a storage area 304 of a vehicle 302 such that the placement surface 306 forms at least a portion of the floor of the storage area 304. This embodiment depicts boundary supports 320 lying flat against the placement surface 306 of the robot 200, although not all embodiments utilize boundary supports 320. In this embodiment boundary supports 320 have a metal grid, although any suitable materials and/or configurations may be utilized in other embodiments. The boundary supports 320 in this embodiment are hingedly connected to the placement surface boundaries 308 along the perimeter of the placement surface 306, such that boundary supports 320 may be foldable at placement surface boundaries 308. In other embodiments a boundary support 320 may be connected by any suitable type of connection (clamp, magnetic, welded, etc.) to any part of the robot 200. Any quantity, type, shape, and/or material(s) may be utilized for a boundary support 320, where any boundary support may differ in any respect from another boundary support 320. Some embodiments utilize boundary supports 320 to cover less than the entire perimeter of the placement surface 306. In some embodiments a boundary support covers a portion of a placement surface boundary 308. Some embodiments may utilize a rounded placement surface 306 having a single boundary support 320 that runs along a single placement surface boundary 308. Some embodiments may feature boundary supports 320 running through the placement surface 306, which may subdivide the placement surface 306.

As discussed in more detail below, boundary supports 320 may unfold upward from a flat horizontal position atop the placement surface 306 to become perpendicular to the placement surface 306, although the unfolded boundary supports 320 may feature any suitable angle with respect to the placement surface 306. When in an upright position, a placement surface boundary 308 may provide stability for objects sitting atop the placement surface 306. In this embodiment the boundary supports 320 may automatically unfold to become upright when the robot 200 exits the storage area 304 and/or may automatically fold downward to lay flat against the placement surface 306 when the robot 200 enters the storage area 304. In other embodiments the folding upward and/or downward may be manually performed, such as by a person or a separate device. In various embodiments the folding up and/or down may be initiated in response to one or more triggering events as discussed above, such as voice and/or gesture commands.

Figure 5B:
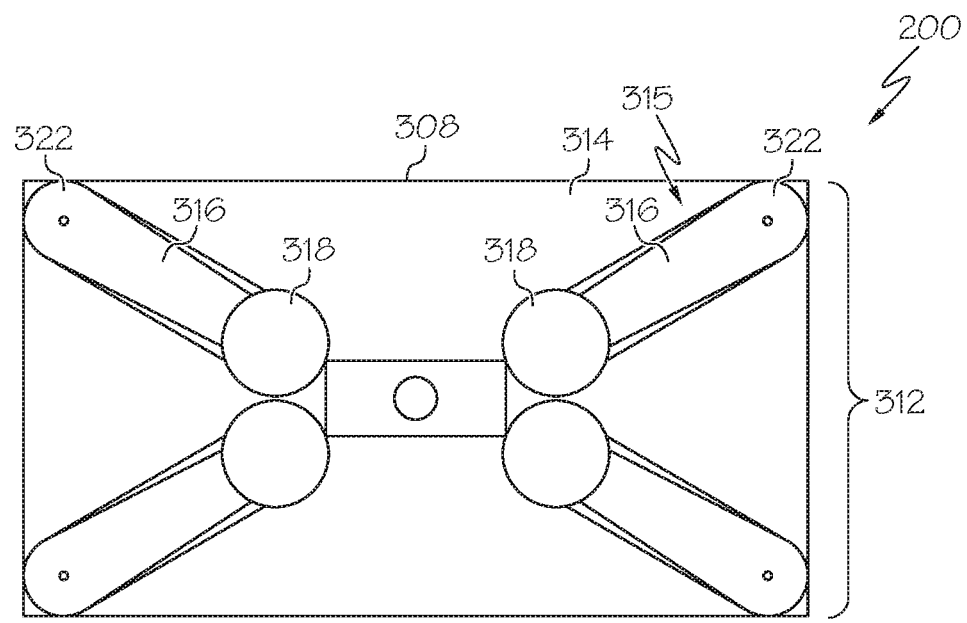
FIG. 5B illustrates a bottom-up view of a robot according to one or more embodiments shown and described herein.

Turning to FIG. 5B, a bottom-up view 500B of a robot 200 is presented. In this embodiment the base 314 of the support portion 312 is shown with the legs 315 and wheels 318 being stowed therein. In other embodiments the legs 315 and/or wheels 318 need not be stowed within the base 314. Wheels 318 in some embodiments may correspond to motorized wheel assemblies 258, although any suitable quantity, type, materials, size, and/or configuration of wheel(s) 318 may be utilized. Where a plurality of wheels 318 are utilized, some may differ from others. In some embodiments, the legs 315 may have flexible joints 322 located between the base 314 and the wheel 318, wherein different portions of the legs 315 can be folded up into the base 314, along with the wheels 318.

Figure 6A:
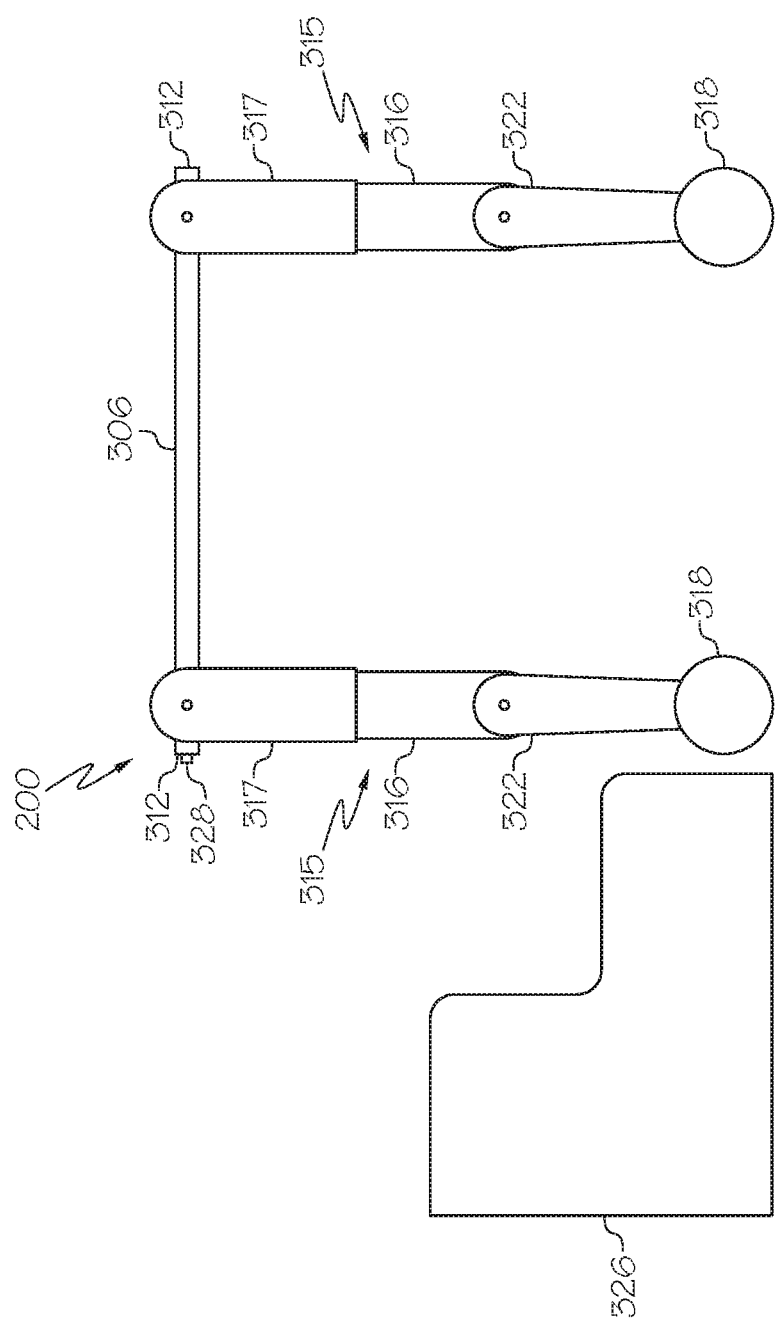
FIG. 6A illustrates a side view of a robot near stairs according to one or more embodiments described and illustrated herein.

Turning to FIG. 6A, a side view of a robot 200 near stairs 326 is presented. In this embodiment, the robot 200 features a receiving telescopic portion 317 and an inserting telescopic portion 316 on each leg 315. In this embodiment the inserting telescopic portion 316 is configured to extend from and retract into the receiving telescopic portion 317. In various embodiments, any given leg 315 may feature one, a plurality, or no receiving telescopic portions 317 and/or inserting telescopic portions 316. In this embodiment a receiving telescopic portion 317 and an inserting telescopic portion 316 may be utilized to adjust the height of the robot 200 and/or length of its respective leg 315. For example, the length of a leg 315 may be shortened by the inserting telescopic portion 316 moving further into the receiving telescopic portion 317. Similarly, the length of a leg 315 may be increased by the inserting telescopic portion 316 moving out of the receiving telescopic portion 317. In various embodiments receiving telescopic portions 317 and inserting telescopic portions 316 may be utilized with or without coordination with the flexible joints 322 (if present) to adjust the height of the robot 200. For example, the height of the placement surface 306 may be increased by a combination of sliding out part of the inserting telescopic portion 316 from inside the receiving telescopic portion 317, along with straightening of the flexible joint 322. In another example, regardless of the current position of the flexible joint 322, the height of the placement surface 306 may be increased by sliding out part of the inserting telescopic portion 316 from inside the receiving telescopic portion 317.

For the robot 200 to ascend and/or descend stairs, any suitable number of legs 315, flexible joints 322 per leg, receiving telescopic portions 317 per leg, inserting telescopic portions 316 per leg, and/or wheels 318 per leg 315 may be utilized (including no flexible joints 322, receiving telescopic portions 317, inserting telescopic portions 316, and/or wheels 318 for a given leg 315). In some embodiments, each leg 315 may be configured differently. In some embodiments a wheel may be locked (manually or automatically) when the robot 200 is climbing stairs or during any other suitable activity. In various embodiments the robot 200 may control the legs 315 to keep the placement surface 306 horizontal or substantially horizontal, which may be constant in some embodiments. In other embodiments the robot may prevent tilt and maintain the placement surface 306 horizontally depending on whether one or more objects are seated/detected upon the placement surface 306. In some embodiments the robot 200 may allow greater variation in rotational movement of the placement surface 306 when no objects are present. In various embodiments this may be based upon a weight sensor, user input, object recognition, etc. In some embodiments the type of object(s) seated upon the placement surface 306 dictates the degree of permissible tilt, with less stable objects permitting less rotational movement of the placement surface 306.

In this embodiment the robot 200 includes two sensors 328 that are visual sensors (e.g., cameras), although other embodiments may include any suitable quantity (including none) of sensors 328. Any suitable types of sensors (visual, weight, tactile, radar, lidar, infrared, time of flight, etc.) may be included on any suitable portion of the robot 200. By way of non-limiting example, the robot 200 in this embodiment utilizes two sensors 328, which are visual sensors, to analyze the stairs 326 and determine the height involved. Continuing with this non-limiting example, the robot 200 may also utilize visual sensors 328 to perform object recognition on objects and/or facial recognition to identify/authenticate people. Additionally, the sensors 328 may be utilized to detect potential hazards or obstacles to avoid and/or to follow a person.

Figure 6B:
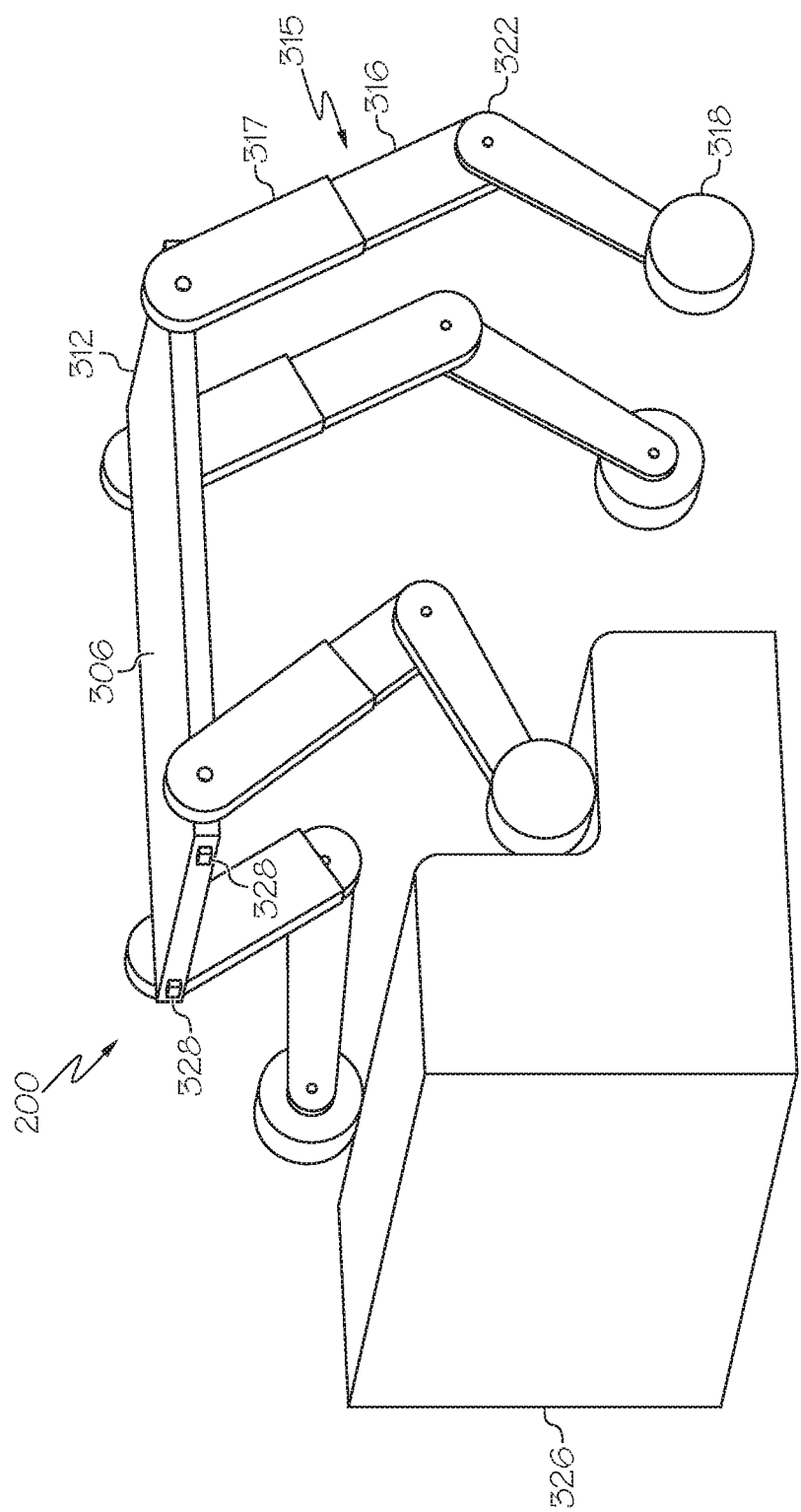
FIG. 6B illustrates a perspective view of a robot depicted in the side view of FIG. 6A traversing stairs according to one or more embodiments described and illustrated herein.

Turning to FIG. 6B, a perspective view of the robot 200 depicted the side view in FIG. 6A is presented with the robot 200 traversing stairs 326.

Turning to FIG. 6C, a side view of a robot 200 traversing stairs 326 is presented. In this embodiment a lift 324 is located on the placement surface 306, specifically above and parallel to the placement surface 306, configured to move orthogonally upward relative to the placement surface 306. In other embodiments any suitable number of lifts 324 may be utilized, or none at all. In this embodiment the legs 315 are configured to adjust the height of the placement surface 306 based upon a height value related to object storage, such as provided by user input, object recognition, etc. In some embodiments a plurality of legs 315 are configured to adjust a height of the placement surface 306 based upon a requested height or a detected height of an object. In one example the height of the placement surface may be adjusted based upon the actuation of the receiving telescoping portions 317 and the inserting telescopic portions 316 and the amount of bending in the flexible joints 322 of the legs 315. The lift 324 in some embodiments may able to tilt its top surface, which can be used for example to counteract any tilt in the placement surface 306. In such embodiments, the lift 324 tilt/movement can be coordinated with the legs 315 to keep the top of the lift 324 horizontal or substantially horizontal. In this embodiment, the height of the lift 324 may be coordinated between the height provided by the legs 315 and the height provided by the lift 324. To reach a convenient height for a user, such as being within a height range of a shelf upon which an object resides, the robot 200 may coordinate the legs 315 and/or the lift 324 to raise/lower the legs 315 and/or the top of the lift 324 to reach the desired height. For example, the robot 200 can vertically position the top of the lift 324 at the same height as a shelf where an object resides that a shopper wants, so that the shopper can more easily move the object onto the lift 324 without having to lift or lower the object himself/herself. In this embodiment the top of lift 324 when at its lowest position is at the same height as the placement surface 306, to form a substantially continuous surface. The height of the lowest position of the lift 324 may differ from the placement surface 306 in other embodiments. In this embodiment, a user may slide or otherwise move objects from the lift to the placement surface 306 when the lift 324 moves to its lowest position in order to make room on the lift 324 for additional objects to be placed upon the lift 324. In this embodiment the robot 200 includes two sensors 234 that are visual sensors, although other embodiments may include any suitable quantity (including none) of sensors 234.

Turning to FIG. 6D, a perspective view of the side view in FIG. 6C is presented.

Figure 7:
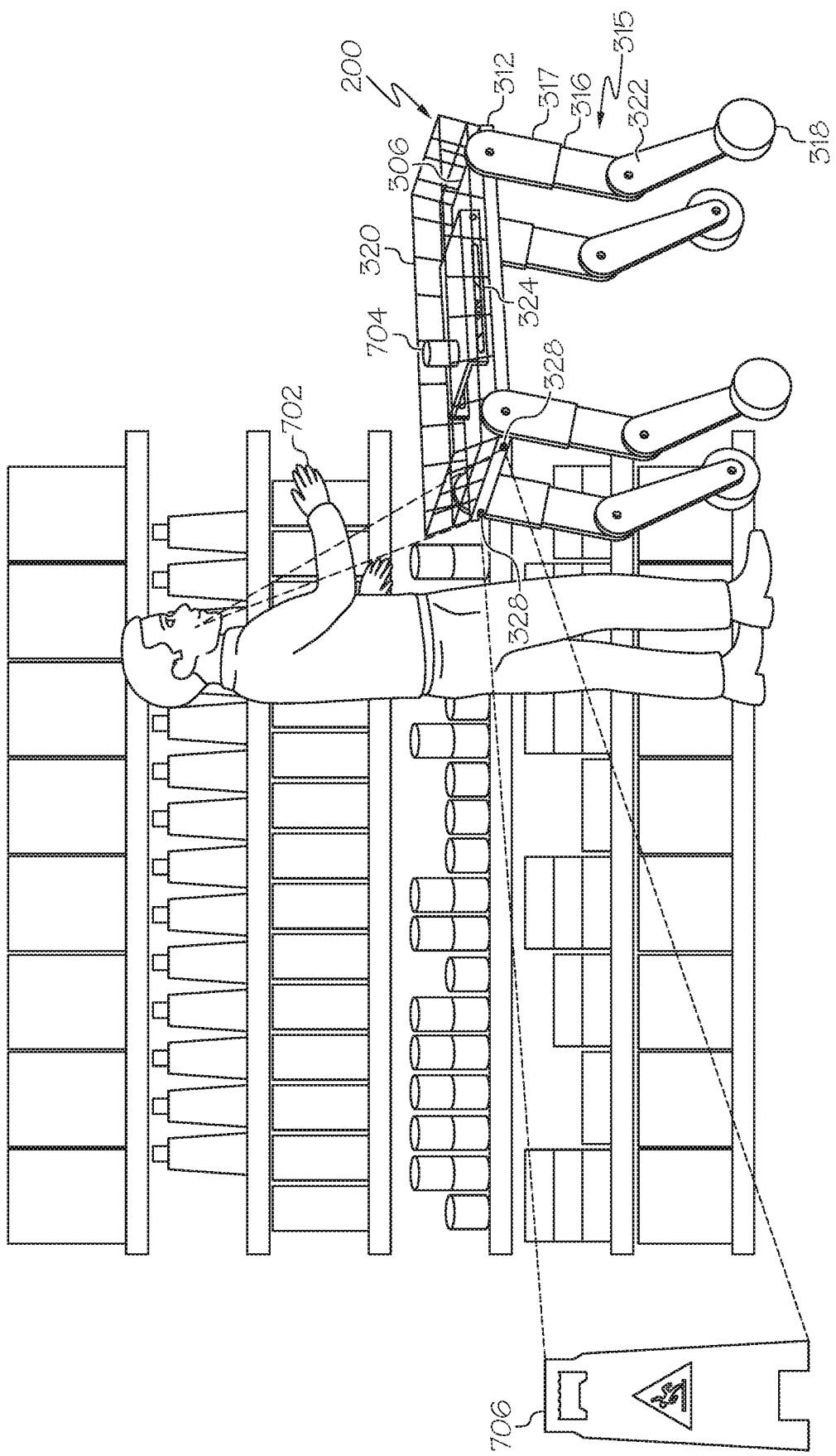
FIG. 7 illustrates a perspective view of a robot following a person and recognizing an obstacle according to one or more embodiments described and illustrated herein.

Turning to FIG. 7, a perspective view of a robot following a person and recognizing an obstacle is presented. In this embodiment a robot 200 that emerged from the storage area of a vehicle (not shown) belonging to a person 702 is following the person 702 into a store. Using sensors 234, which in this non-limiting example are visual sensors, the robot 200 follows the person 702 based upon a specified following distance, which may be any suitable value or range as received as an input value from the person 702 or elsewhere. In other embodiments the robot may utilize proximity sensors 254 to stay within range of the person 702 and/or detect objects generally. The robot is also able to detect obstacles 706, including hazards, which in this example include a wet floor sign. Here, the person 702 has taken an object 704 off of a shelf and placed it onto the robot 200. The object 704 sits upon the placement surface 306 of the robot 200 approximately waist-high relative to the person 702 for the convenience and ease of retrieval of the object 704 by the person 702 from the robot 200. In this embodiment the sensors 234 detect where a person is looking at and/or reaching for an object 704, in which case the robot 200 may adjust its height to correspond to the shelf height, or otherwise as high as the robot can reach, to make placing the object 704 on the robot 200 more convenient for the person 702. For example, the robot 200 may adjust the height of the placement surface 306 based upon the extendable height of one or more legs 315 of the robot, which may be based on the amount of bending in the flexible joints 322 and/or the amount of actuation in the receiving telescopic portions 317 and the inserting telescopic portions 316, as well as an extendable height of the lift 324 that upwardly extends orthogonal to the placement surface 306. In still other embodiments the height of the placement surface 306 may be adjusted to be within a threshold height of an identified object 704. In various embodiments the lift 324 may extend diagonally upward. In this embodiment four boundary supports 320 have been raised to provide stability for objects 704 residing on the placement surface 306.

In this embodiment, when the person 702 returns to their vehicle (not shown) following a shopping trip at one or more stores, the robot 200 may accordingly follow the person 702. As described above with respect to FIG. 4, one or more guide rails may then automatically extend out of the storage area of the vehicle based upon the approach of the person 702 and/or the robot 200. In this embodiment the robot 200 may then automatically engage the guide rail and re-enter a storage area of the vehicle with one or more objects 704 obtained during the shopping trip, by way of non-limiting example. Once inside the storage area, some or all of the boundary supports 320 may remain upright or be lowered to lie flat against the placement surface. In some embodiments the boundary supports 320 may not lower if weight is detected on the placement surface 306. In other embodiments the boundary supports 320 may automatically lower upon entry of the robot 200 into the storage area of the vehicle. Still other embodiments may allow for manual manipulation (such as raising/lowering) of the boundary supports 320 by a person 702 or a separate device.

Entry of the robot 200 into the storage area of a vehicle in these embodiments may provide stability for the transport and/or storage of various objects 704 resting upon the placement surface 306. As described above with respect to FIG. 4, the robot 200 may maintain a level placement surface 306 to prevent objects 704 from sliding around and/or falling off the robot 200. Additionally, boundary supports 320 may provide a layer of protection for objects 704 resting upon the placement surface 306 by preventing such objects 704 from falling off the robot 200, even if the placement surface 306 is not level. In this way, the robot 200 may provide convenience and stability for the person 702 by automatically loading one or more objects 704 into the storage space of a vehicle. This in turn may eliminate the need for the person 702 to manually load (and unload) objects from the storage space, which can reduce the potential for injury to the person 702 from lifting/loading heavy objects, as well as the convenience of not having to perform these activities in undesirable conditions, such as in hot or cold weather.

Figure 8A:
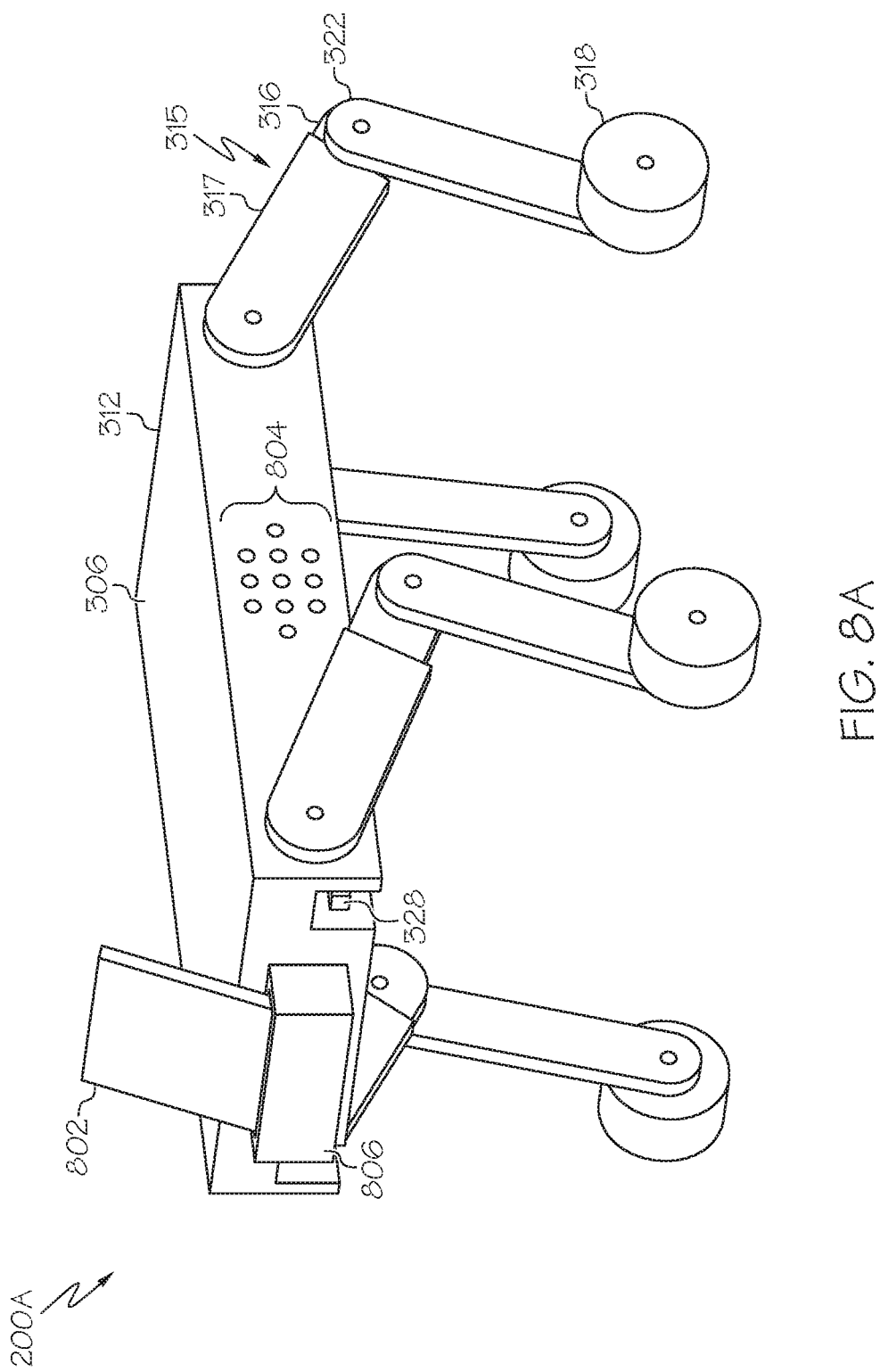
FIG. 8A illustrates a perspective view of a robot featuring a retractable display and a speaker according to one or more embodiments described and illustrated herein.

Turning to FIG. 8A, a perspective view of a robot 200A is presented. In this embodiment, the robot features a display 802, a speaker 804, a display mechanism 806, batteries (not shown), sensors (not shown), and/or wiring (not shown). In this embodiment the robot 200A may feature one or more displays 802, or no display. Any suitable type of display, such as an LED, LCD, OLED, tablet, plasma display, CRT, holographic display, 3D display, may be utilized. Some embodiments may utilize a display as part of an external human-machine interface. In this embodiment the robot, 200A may feature one or more speakers 804, or no speakers. Any suitable type of audio output device may be utilized for a speaker 804. Any suitable type of audio output device may be utilized for a speaker 804. In this embodiment the display 802 may be part of or otherwise utilize a display mechanism 806. In this embodiment the display mechanism 806 is retractable into the robot 200A. In various embodiments any retractable component may retract into any suitable portion of the robot 200A. Any suitable type of retraction mechanism(s) may be utilized. As shown in FIG. 8A, sensors 324 utilized by the robot may include, for example, one or more microphones and/or cameras. A sensor 324 may be a microphone utilized, for example, for receiving voice commands and/or voice recognition/authentication. A sensor 324 may be a camera, which may be utilized for any suitable purpose such as gaze detection, pose estimation, object recognition, etc. For example, sensors 324 may implement gaze detection to follow where the person 702 is looking (See FIG. 7), which may in turn help with navigation and/or assisting with object 704 placement/removal. Sensors 324 may be utilized to detect gestures and/or facial expressions of a person 702.

The robot 200A may utilize cameras 244 to determine the orientation of a person 702, an object 704, or an obstacle 706, which may then be used for self-navigation and object management. Cameras 244 may be utilized for scanning objects 704, such as object recognition and barcode/QR-code scanning. Sensors 328 may be radar and/or sonar sensors and utilized for object detection and navigation purposes in any type environment. The sensors 328 may be utilized for detection through any type of medium (gas, liquid, solid, etc.). In some embodiments the robot 200A may navigate utilizing location-based services such as GPS or cellular networks. The robot 200A may utilize location data from a device (smartphone, tablet, etc.) of a person 702. The robot 200A may utilize indoor maps to assist with navigation. For example, the robot 200A may download a map of a store's floorplan for navigation. The robot 200A may track objects 704 placed on the placement surface 306 for automatic checkout. For example, objects 704 on the placement surface 306 may utilize RFID to facilitate automatic purchasing upon the robot 200A exiting a store. The robot 200A may utilize any suitable form of payment (credit card, crypto-currency, etc.) to pay for objects 704 residing on the placement surface 306.

The robot 200A may be situationally-aware in some embodiments. For example, as discussed above with respect to avoiding obstacles 706, the robot 200A may be aware of an a warning sign posing an obstacle 706 that can be identified, located, and avoided. In another example, the robot 200A may ascertain the movement of pedestrians, vehicles, and bicycles to make determine a general flow as well as which pedestrians have the right-of-way. In this way, the robot 200A may determine the correct side of a street for navigation purposes. In some embodiments, the robot 200A may be contextually aware. For example, the robot 200A may identify an object 704 that a person 702 is looking for, such as a grocery item. This may be based upon cues provided by the person 702 (e.g., visual cues such as eye movements or gestures, verbal cues, textual input, etc.). This may also be based upon the current location of the robot 200A or the person 702. The robot 200A may provide a shopping list for the person 702 on-demand and may be able to call other people. The robot 200A may offer to display/recite the shopping list to the person 702. The robot 200A may put the person 702 in touch with other people, such as by phone or video chat. In some examples, the robot 200A may analyze the facial expression of a person 702 (confused, frustrated, etc.) or their audio cues ("Hmmm"). In this way, the robot 200A may become contextually aware of what the person 702 needs and may offer assistance to the person 702.

The robot 200A may also support personalization, such as adapting to what a person 702 may require. This may be based upon learning the preferences of a person 702, such as purchasing preferences. These preferences may be based upon suitable factors such as frequency of purchase and demographics of the person 702. As an example, purchase frequency may be in relation to perishable groceries. Preferences may also be combined with other types of information such as date/location to provide personalized recommendations. In some embodiments, the robot 200A may provide for the ability of a person 702 to make purchases across devices/services, such as through the person's vehicle, smartphone, or a digital assistant provided by other platforms.

Figure 8B:
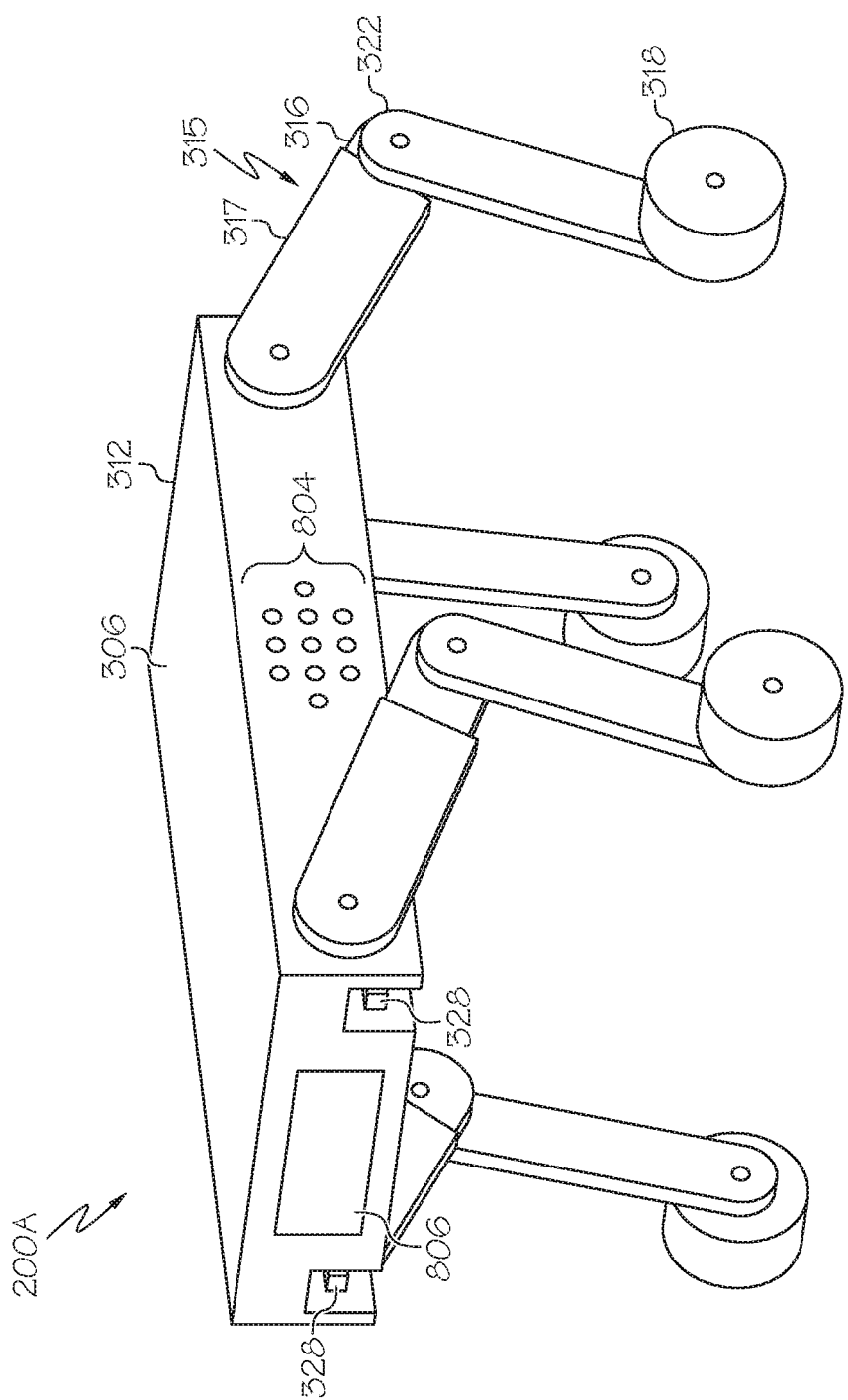
FIG. 8B illustrates a perspective view of a robot depicted in the perspective view of FIG. 8A featuring a retracted display and a speaker according to one or more embodiments described and illustrated herein.

Turning to FIG. 8B, a perspective view of a robot 200A is presented. In this embodiment, the display mechanism 806 has retracted into the robot 200A, such that the display is stored internally within the robot 200A. Any suitable component and/or combination of robot components may be retractable, purely internal, and/or purely external on the robot 200A.

Turning to FIG. 9, a side view of a robot 200B near stairs 326 is presented. In this embodiment, the robot features flexible joints 322 to adjust the height of the support portion 312 and its placement surface 306 without telescopic portions.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a vehicle comprising:
      a storage area; and
      a guide rail configured to extend from the storage area; and
   a robot comprising:
      a support portion comprising a placement surface and a base;
      a plurality of non-parallel boundaries of the placement surface;
      a lift located on the placement surface between the plurality of non-parallel boundaries, wherein the lift is configured to move orthogonally relative to the placement surface;
      a plurality of descendible wheels; and
      a plurality of legs, each connecting the support portion to one of the plurality of descendible wheels.

2. The system of claim 1 wherein the descendible wheels are configured to be actuated from a stored position under the base to drop down to ground-level when the robot exits the storage area.

3. The system of claim 1, wherein the plurality of legs and the plurality of descendible wheels are configured to fold into the base.

4. The system of claim 1 wherein the robot is configured to utilize the guide rails to enter or exit the storage area while maintaining the placement surface at a horizontal level without tilt.

5. The system of claim 4 wherein the guide rails are detachably coupled to the robot during entry or exit of the storage area.

6. The system of claim 1, wherein the plurality of legs are configured to adjust a height of the placement surface based upon a requested height or a detected height of an object.

7. The system of claim 1 wherein the placement surface is configured to be a floor of the storage area of the vehicle.

8. The system of claim 1 wherein at least one of the plurality of legs comprises, between a descendible wheel and the base, at least one of:
   a telescopic portion; and
   a flexible joint.

9. The system of claim 1 wherein the robot further comprises one or more sensors configured to assist the robot with person recognition or object recognition.

10. The system of claim 9 wherein the robot is configured to utilize the one or more sensors to follow a person or avoid obstacles.

11. The system of claim 1 wherein the robot further comprises a lift located above and parallel to the placement surface, wherein the lift is configured to move orthogonally to the placement surface.

12. The system of claim 1 wherein the legs of the robot are configured to adjust a height of the placement surface upon an input related to object storage.

13. The system of claim 1 wherein the robot is configured to ascend or descend stairs.

14. The system of claim 1 wherein the robot further comprises at least one of a retractable display and a speaker.

15. A method comprising:
   extending a guide rail to protrude outside of a vehicle from within a storage area of the vehicle;
   moving a robot, having a placement surface acting as a floor of the storage area, onto the guide rail;
   descending wheels from the robot once the robot exits the storage area;
   separating the guide rail and the robot;
   retracting the guide rail back into the storage area;
   maintaining the placement surface to be within a threshold angular distance of being horizontal;
   unfolding a boundary support at a boundary of the placement surface, wherein the boundary support is foldable at the boundary of the placement surface; and
   identifying an object that the person intends to purchase based upon a visual cue or verbal cue provided by the user.

16. The method of claim 15, further comprising:
   having the robot approach the vehicle;
   extending the guide rail from the storage area;
   engaging the robot to the guide rail;
   having the robot travel into the storage area; and
   having the placement surface become the floor of the storage area.

17. The method of claim 15, wherein the robot performs the following:
   avoiding obstacles in a path of the robot;
   following a person by staying within a threshold of the person; and
   adjusting a height of the placement surface to be within a threshold height of an identified object.

18. The method of claim 15, further comprising adjusting a height of the placement surface based upon extendable height of one or more legs of the robot, wherein at least one leg comprises, between a descendible wheel and the base, at least one of:
   a telescopic portion; and
   a flexible joint.

19. The method of claim 15, wherein the identifying is based upon the visual cue further comprising eye movement of the user.

20. The system of claim 1 further comprising a plurality of discrete boundary supports at the plurality of non-parallel boundaries of the placement surface, wherein the discrete boundary supports are foldable at the boundaries of the placement surface, wherein at least two of the plurality of discrete boundary supports are non-parallel.

* * * * *